Sept. 20, 1960 R. L. KING 2,952,901
METHOD OF MAKING A ROD END BEARING
Filed Nov. 21, 1957 2 Sheets-Sheet 1
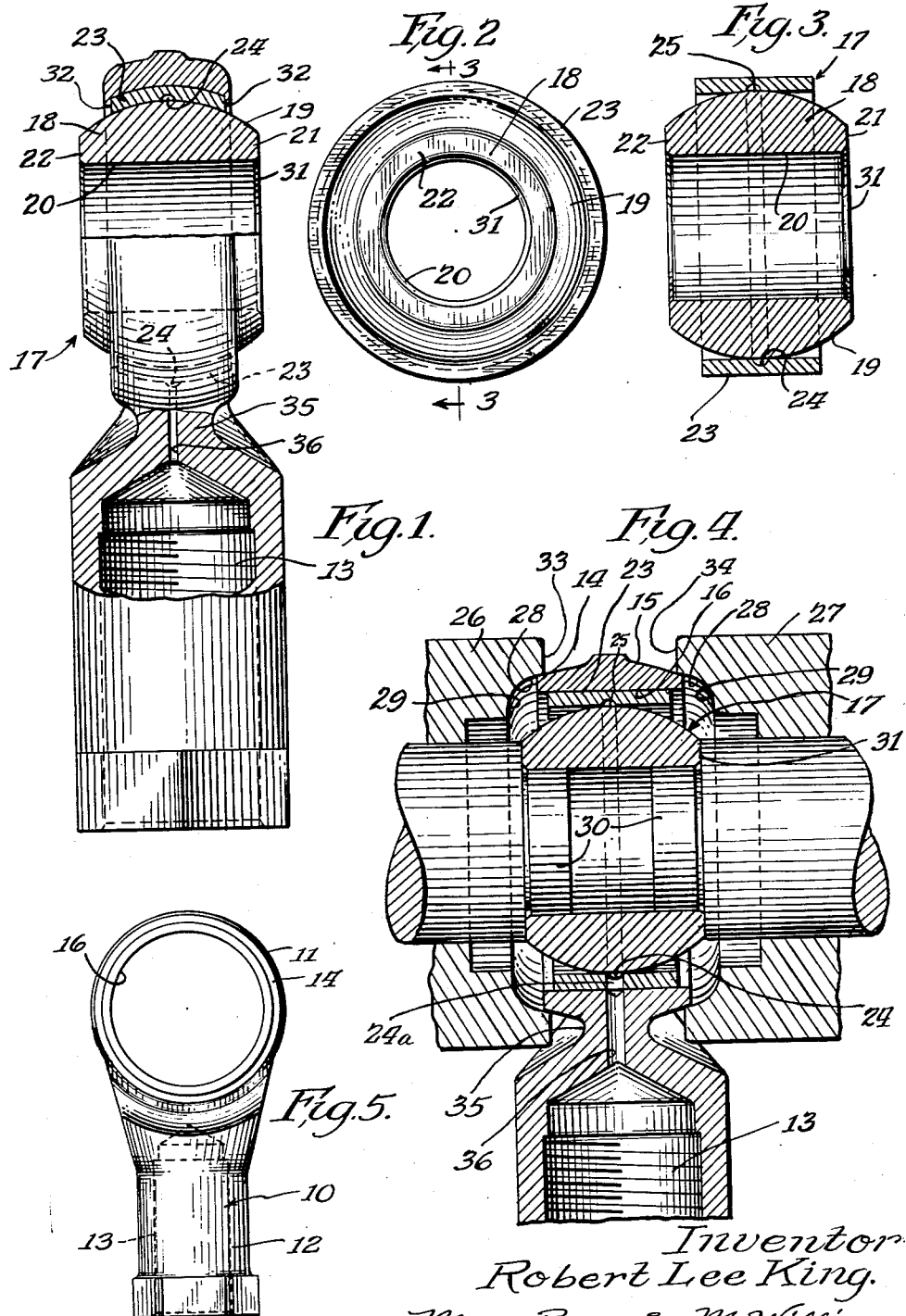
Inventor
Robert Lee King.
By Mann, Brown & McWilliams,
Attys Sept. 20, 1960           R. L. KING           2,952,901
METHOD OF MAKING A ROD END BEARING
Filed Nov. 21, 1957           2 Sheets-Sheet 2
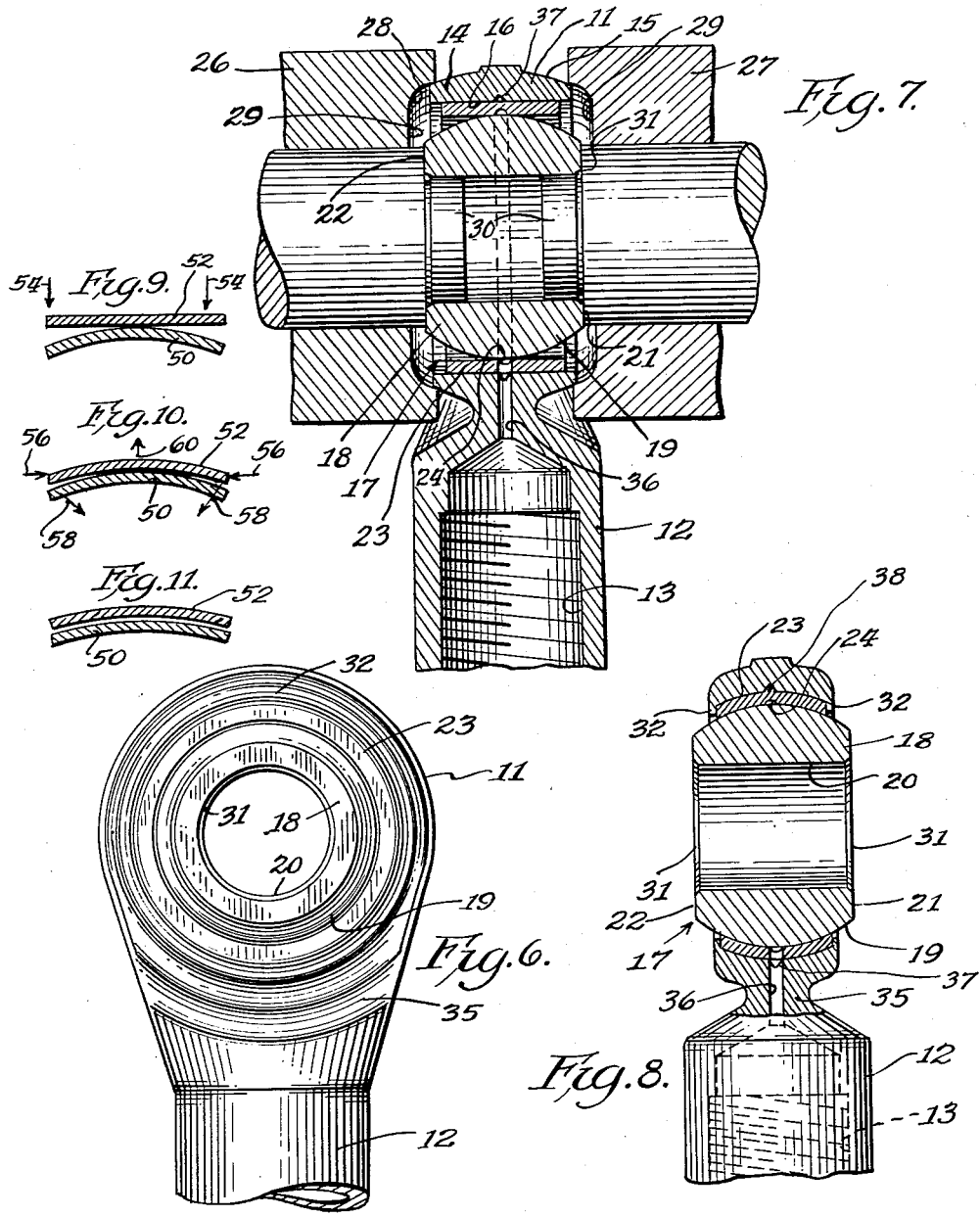
Inventor
Robert Lee King.
By Mann, Brown and McWilliams.
Attys.

United States Patent Office 2,952,901
Patented Sept. 20, 1960

2,952,901

METHOD OF MAKING A ROD END BEARING

Robert Lee King, Aurora, Ill., assignor to Stephens-Adamson Mfg. Co., a corporation of Illinois Filed Nov. 21, 1957, Ser. No. 697,844

3 Claims. (Cl. 29—149.5)

This invention relates to rod ends of a type in which a spherical bearing is incorporated, and has for its principal object a novel method of producing such rod ends, particularly those of a three-piece type.

The rod end produced by my method also constitutes a part of my invention as it is superior to those of the prior art.

A rod end having a spherical bearing is used in many applications where the member to which it is connected has limited angular movement with respect to the rod end. The construction to be commercially acceptable must be strong and sturdy, have free bearing movement, and be capable of taking substantial thrust loads. The present invention provides such a rod end construction and a novel method for its production.

Among other objects and advantages of my invention are the following: The employment of a method which, during the formation of the spherical seat for the inner bearing member or race, automatically relieves any binding of the bearing which may be effected during the forming operation; the use of positioning means in the outer race of the bearing for properly locating the spherical inner bearing within the race during the forming operation; the forming, in the case of three-piece rod ends, of an interlock between the rod end and the outer race in a single swaging operation; the use of a single piece outer race; the use of minimum amounts of expensive materials in providing high quality rod ends; and the production of a three-piece rod end which is of high quality, having superior characteristics to those commonly in use today, and yet inexpensive to manufacture.

Although this invention is primarily directed to three-piece rod ends (i.e., rod ends which include an outer race of a material different from that of the rod end itself), the invention has certain applicability to two-piece rod ends in which the rod end itself constitutes the outer race of the bearing.

Further and other objects of the invention will be apparent as the disclosure proceeds and the description is read in conjunction with the accompanying drawings, in which:

Figure 1 is a side elevational view, partly in section, showing my improved three-piece rod end;

Figure 2 is a front view of the ball and race prior to forming;

Figure 3 is a sectional view taken on the line 3—3 of Figure 2;

Figure 4 is a sectional view showing the components of the three-piece rod end prior to deformation in the swaging die;

Figure 5 is a front elevational view of the rod end prior to its reception of the ball and race insert shown in Figures 2 and 3;

Figure 6 is a front elevational view of the completed three-piece rod end;

Figure 7 illustrates my process of forming a slightly different three-piece rod end;

Figure 8 is a sectional view of this modified form showing the completed rod end with its self-aligning bearing; and Figures 9–11 are diagrammatic sectional views illustrating the basic principles of an importnat feature of my invention.

Referring now to the drawings, there is illustrated in Figure 5 a female rod end 10, which may be cast or forged or machined in aluminum, ductile iron, SAE 4130 steel, or low carbon steel such as C–1117, or other suitable malleable or ductile material, and it comprises a bearing receiving portion 11 integrally cast with a hollow stem 12, which in this instance is drilled and tapped as indicated at 13 for the reception of a male connecting member. The outer side margins of the bearing portion 11 are machined or coined at 14 and 15 (Figure 4) for coaction with the swaging dies, and the internal surface 16 is broached for the reception of a bearing insert generally designated 17 (Figure 3).

It is obvious that the rod end 10 may be provided with a male connecting stem rather than a female connecting stem.

The bearing insert 17 comprises a spherical ball 18 of steel or other suitable material, and it is normally chrome plated to give it a smooth and lasting wearing surface. The ball has a spherically shaped surface 19, an internal bore 20 for the reception of the member to which it is connected, and flat end faces 21 and 22.

The race 23 consists of a simple ring having a straight cylindrical wall of uniform thickness except for the lubricating groove 24 provided in the mid-section of its inner surface and a lubrication hole or holes 24a extending radially of the race. The race 23 may be made of SAE 4130 steel, stainless steel, or even of hard aluminum or brass. Since the material used for the race is generally a rather expensive material due to the high wearing qualities and/or qualities of corrosion resistance which it must possess, it is significant that the race 23 is of relatively small dimension as compared to the entire rod end, and the latter may be made of cheaper material, its only requirement being that it have adequate strength for the purposes for which it is to be used, and that it be sufficiently ductile so that it may be swaged to form.

The ball 18, of course, has its greatest diameter at the point 25, and this diameter is a few thousandths of an inch in excess of the internal diameter of the race 23 so that it requires a force fit to insert the ball within the race 23, the latter expanding within its elastic limit to permit this to be accomplished. At the same time, the lubricating groove 24 is of such diameter that when the ball is pressed into the race 23, there is a snap fit when the center of the ball reaches the groove 24, and when in this position, the ball is preferably free to rotate about its central axis within the race 23. In other words, the width of the lubricating groove is preferably so related to the excess in diameter of the ball 18 that when the ball reaches its medial position within the race, the ball snaps into place and is then free to rotate about its central axis.

After the ball and race 23 have been assembled in the manner shown in Figures 2 and 3 and then slipped within the bearing portion 11 of the rod end, the combined members are then placed in a swaging die such as shown in Figure 4. This die consists of opposed members 26 and 27, each having an annular spherically-shaped forming face 28 which connects rather abruptly with a compression face 29. The dies 26 and 27 also have central hub portions 30 which slidably engage the bore 20 in the ball 18 and hold it in proper position for the forming operation. The ends of the bore 20 are preferably champfered as shown at 31 to aid in the reception of the hubs 30.

After the rod end with its insert is placed in the die as shown in Figure 4 with the rod end being accurately supported in position by the hubs 30, the dies are closed to a limited extent or by limited pressure to form the race 23 and the bearing portion 11 of the rod end about the ball 18 and give it the shape which is shown in Figure 1. During the swaging step, the forming face 28 of each die contacts the machined or coined side portions 14 and 15 of the bearing portion 11 of the rod end and swage the outer race 23 toward engagement with the spherical outer surface of the ball 18. It should be noted, however, that the axial length of the bearing race 23 is less than the axial length of the bearing portion 11 so that during this forming step the extreme end walls of the bearing portion 11 are forced downwardly over the ends of the race 23 and then compressed by the compression faces 29 of the dies 26 and 27 to form lips 32 which serve to lock the outer race 23 within the rod end.

After the lips 32 are formed about the race 23 and during the same closing action of the dies 26 and 27, axial forces are applied to opposite ends of the race 23 through the lips 32, which cause the race to buckle slightly outwardly in the central portion and thereby relieve radial compressive forces which may have developed between the race 23 and the ball 18 during the initial closing of the dies. The dies 26 and 27 are so shaped that during closure, the forming faces 28 only partially force the outer margins of the bearing portion, and hence the race 23, into contact with the face of the ball 18, and thereafter the axial forces applied by the compression faces 29 not only tend to buckle the central portion of the race away from the ball 18 to free it, but also complete the formation of the spherical seat for the outer race and the enveloping bearing portion 11 of the rod end.

It will be noted that the ends 33 and 34 of the dies are spaced apart a sufficient distance that the central portion of the rod end is unconfined during the forming operation with the result that this buckling force is unopposed by the dies themselves, and only sufficient pressure is applied to the dies after the bearing portion 11 and the race 23 have been spherically shaped to match the contour of the ball 18 and after the lips 32 have been formed to secure the race 23 within the rod end, to loosen the bearing so that it is free to rotate within its socket after removal from the dies. Obviously, this can be accomplished by limiting the extent of travel of the dies or by limiting the pressure applied to the dies, the latter being preferable.

It will be noted that the body portion of the rod end is reduced as indicated at 35 to accommodate the die structure about the entire periphery of the bearing portion 11 of the rod end.

As is conventional, the rod end may be provided with a lubricating groove such as indicated at 36 for supplying lubricant to the groove 24 in the outer race 23.

From the above description of my improved process, it will be seen that a high quality rod end bearing construction can be formed, using minimum quantities of the more expensive, high-wearing, non-corrosive materials, and that a single swaging operation serves the purpose of forming the outer race and rod end about the spherical ball, locking the outer race within the rod end and applying the necessary forces for relieving stresses in the bearing assembly which are formed, or may be formed, during the swaging operation that tend to freeze the ball within its socket.

Of equal importance to the novelty of my improved method for making a three-piece, self-aligning rod end, is the superior quality of the end product. Rod ends of this type are often called upon to carry substantial thrust loads, that is, loads which are along the central axis of the ball 18; and in many prior art constructions, swaged lips, such as shown at 32, or equivalent lips swaged from the ball race over the rod end, constitute the only metal section that is positioned to withstand thrust loads. In my improved rod end, it will be noted that the entire bearing portion 11 is curved concentrically with the ball 18 and the race 23 so that thrust loads are resisted not only by the lips 32, but also by the entire section of the bearing portion 11 and race 23.

Furthermore, the race 23 is of uniform thickness throughout its entire width, which means that only a sufficient amount of the more expensive metal used for the race is required for given load characteristics and no more. Likewise, all of the metal in the bearing portion of the rod end is used structurally because of its concentric shaping with respect to the ball 18. In the modified form of the invention shown in Figures 7 and 8, exactly the same procedure is used in forming the three-piece rod end shown in these figures, with the exception that a V-shaped groove 37 is formed in the broached inner face of the bearing portion 11 so that when the compression faces 29 of the dies 26 and 27 exert opposed axial forces which tend to buckle the race 23 outwardly to relieve compressive forces which are set up during the preliminary stages of the forming operation, there is a place for the metal in the outer race 23 to flow, such as indicated at 38 in Figure 8. This forms a further interlock between the rod end and the housed bearing to resist thrust loads.

To the extent that the same or corresponding parts are shown in Figures 7 and 8, like reference characters are used.

Although this invention has been shown applied to a three-piece rod end and has particular applicability to this type of rod end, it will be obvious to those skilled in the art that certain features of the invention would be applicable, and are applicable, to two-piece rod ends in which the outer race 23 is omitted and the bearing portion of the rod end would be provided with a lubricating groove and become the outer race and seat for the ball 18. This is particularly true with respect to the exertion of lateral pressure on sides of the rod end during the final stage of the swaging operation so as to free the bearing of binding stresses which tend to keep the ball from rotating within its socket.

However, due to the greater mass of metal in the bearing portion 11, it may in some instances be necessary to cool the rod end blank, and/or pre-heat the ball 18, so as to obtain the desired free-rotating relationship of the ball within the lubricating groove at normal temperatures, with the groove still serving to axially position the ball within the bearing portion 11 during the swaging operation.

Certain aspects of this invention have broad applicability to the self-aligning bearing art as distinguished from rod ends specifically. For example, the concept of forming the spherically shaped bearing seat for an inner spherically shaped bearing member by first mounting the inner bearing member within a cylindrical sleeve of some type, then partially deforming the end walls of the sleeve to give the bearing seat an arcuate shape of greater radius than the inner bearing member, and then applying diametrically opposed inwardly directed forces on the ends of the partially formed bearing seat in order to complete the deformation to the desired radius, while simultaneously developing forces which tend to enlarge the bearing seat at its point of greatest diameter, is an entirely new concept of forming a self-aligning bearing. Obviously, the diametrically opposed pressures on the outer bearing member which are applied to complete the formation of the spherical seat may be limited as desired so as to avoid the development of radial compressive stresses which would tend to cause a binding on the inner bearing member.

This is diagrammatically illustrated in Figures 9–11 which respectively show in section a segment of an inner spherical shaped bearing member 50, which may be the outer race of an antifriction bearing, and a segment of a cylindrical sleeve 52, which may be the portion of a flange or pillow block type housing (which may be either stamped, cast, forged, etc. out of appropriate materials) in which a spherical seat is to be formed for member 50. To form the seat (see Figure 9) compressive forces are applied to sleeve 52 about the ends thereof in the direction indicated by arrows 54 until the sleeve has approximately the shape shown in Figure 10; the sleeve thus has a concave shape of greater radius than the inner member 50. Then, inwardly directed diametrically opposed compressive forces are applied to the ends of the sleeve as indicated by arrows 56, in Figure 10, which completes the formation of the bearing seat, thus providing (see Figure 11) a relationship between members 50 and 52 such as that indicated in Figure 1. The forces indicated by arrows 56 are divided into two components; arrows 58 indicate the inwardly directed components which tend to further concavely deform the ends of the sleeve, while arrow 60 indicates an outwardly directed component, which tends to buckle the center portion of the sleeve outwardly of member 50, and thus relieve any binding that might otherwise occur about the axial center of the bearing seat. The forces indicated by arrows 54 and 56 may be applied separately and consecutively, or substantially simultaneously as by using dies of the type indicated in Figures 4 and 7. Of course, the ends of the sleeve must first be bent out of the plane of the sleeve before buckling component 60 is provided.

The term "ductile" as employed in the appended claims means all materials of the type mentioned in the specification as well as all suitable materials of the ductile or malleable type.

A person skilled in the art will readily appreciate that my method and product may be modified within the scope of the appended claims. Such modifications are intended to be covered.

I claim:

1. The method of swaging the outer annular component of a self-aligning bearing about the inner spherically contoured component thereof, which includes placing the inner component within the outer component, swaging the outer component into substantial spherical conformity with the spherical contour of the inner component, and then, while the mid-section of the outer component is radially unconfined, applying inwardly directed opposed forces to opposite sides of the outer annular component to cause the latter to buckle and bend outwardly to thereby free any binding action that occurs between the mid-section of the outer annular component and the adjacent portion of the inner component.

2. The method of making a rod end bearing unit which includes taking a rod end blank of ductile material having a generally annular bearing member receiving portion, placing a bearing member having a spherically contoured outer surface within said bearing member receiving portion, swaging the bearing member receiving portion into substantial spherical conformity with the spherically contoured outer surface of said bearing member, and then, while the mid-section of the bearing member receiving portion is radially unconfined, applying inwardly directed opposed forces to opposite sides of the bearing receiving portion to cause the latter to buckle and bend outwardly to thereby free any binding action that occurs between the mid-section of the bearing receiving portion and the adjacent portion of the bearing member.

3. The method of making a three piece rod end bearing unit which includes taking a rod end blank of ductile material having a generally annular bearing member receiving portion, positioning concentrically and symmetrically within said bearing member receiving portion a bearing member having a spherically contoured outer surface and a cylindrical race member, swaging the bearing receiving portion and the race member into substantially spherical conformity with the spherically contoured outer surface of said bearing member, and then, while the mid-section of the bearing receiving portion remains radially unconfined, applying inwardly directed opposed forces to opposite sides of the bearing receiving portion and the race member to cause the latter to buckle and bend outwardly to thereby free any binding action that occurs between the mid-section of the race member and the adjacent portion of the bearing member.

References Cited in the file of this patent

UNITED STATES PATENTS

| | | |
|---|---|---|
| 2,272,118 | Imse et al. | Feb. 3, 1942 |
| 2,462,138 | Spangenberg | Feb. 22, 1949 |
| 2,728,975 | Potter | Jan. 3, 1956 |
| 2,787,048 | Heim | Apr. 2, 1957 |
| 2,796,304 | Downs | June 18, 1957 |